Jan. 26, 1932.     W. FERRIS ET AL     1,843,082
FLUID DRIVE FOR PLANERS
Filed Feb. 18, 1926     2 Sheets-Sheet 1
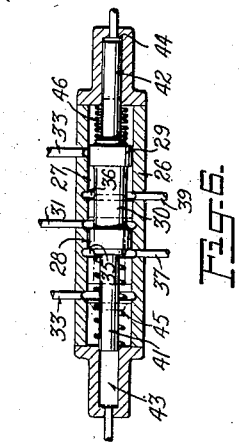
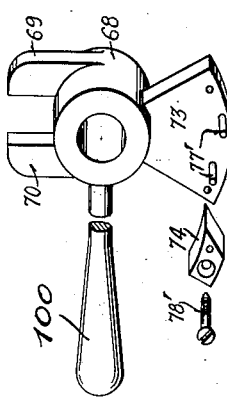
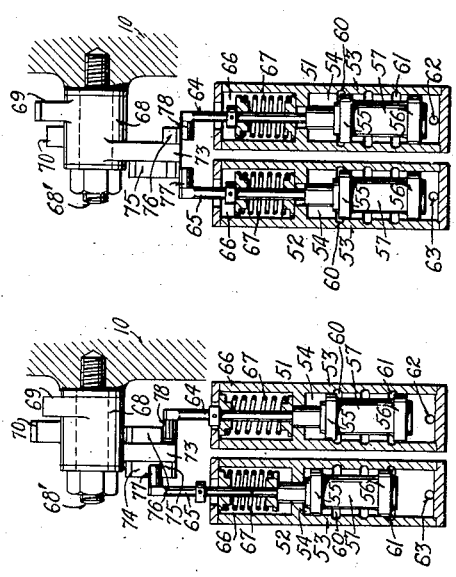
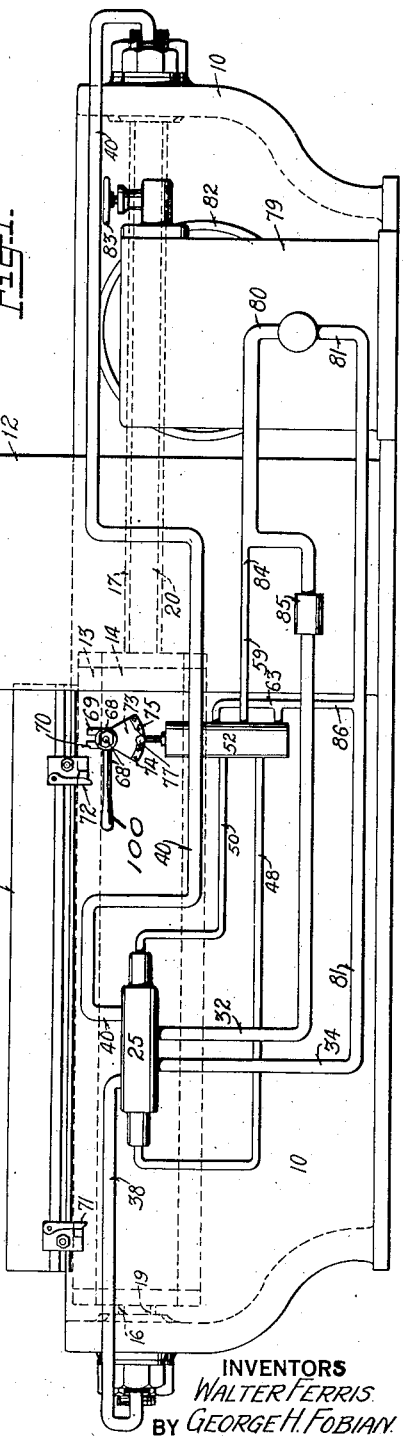
INVENTORS
WALTER FERRIS
BY GEORGE H. FOBIAN
ATTORNEY

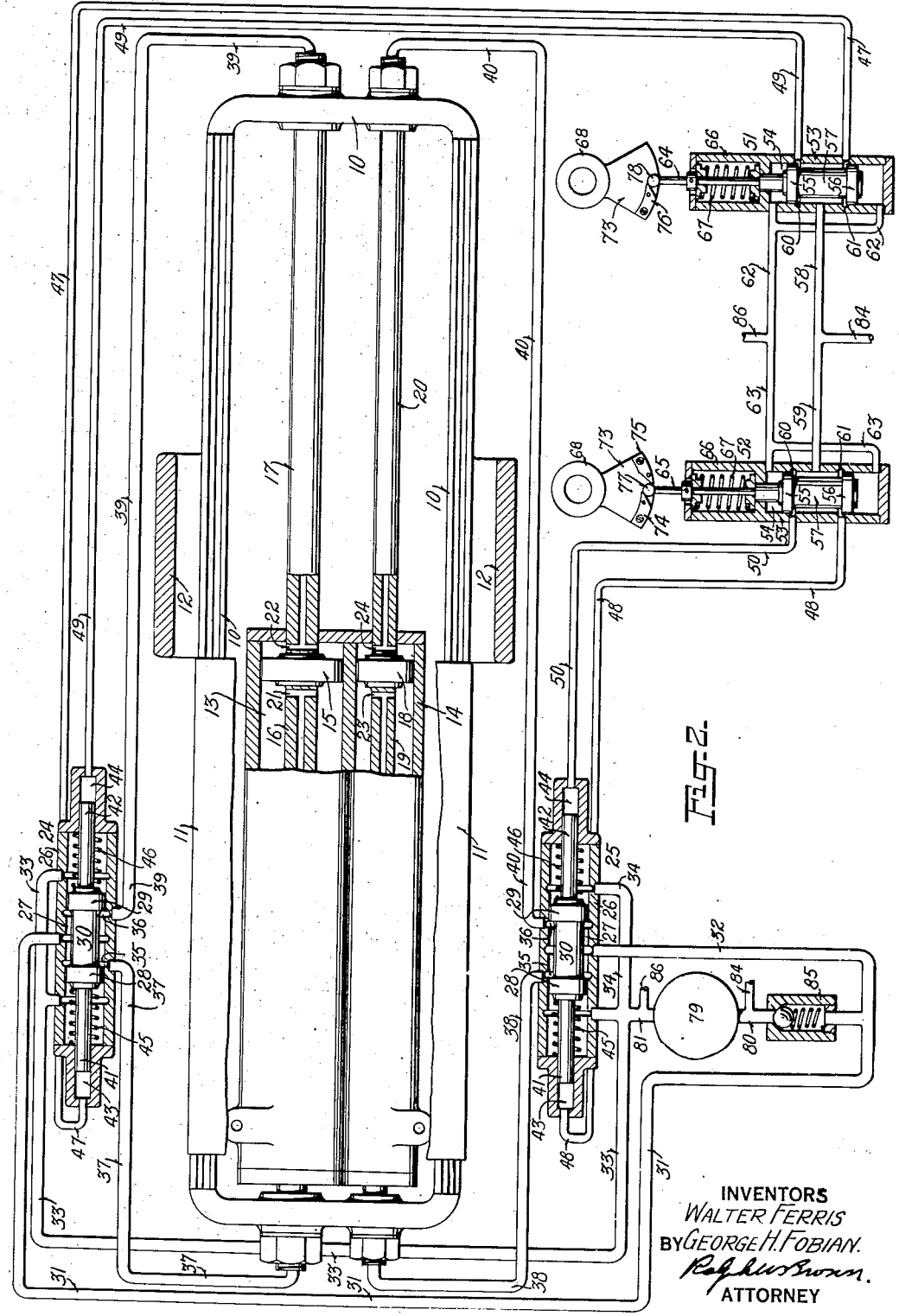

Patented Jan. 26, 1932

1,843,082

UNITED STATES PATENT OFFICE

WALTER FERRIS AND GEORGE H. FOBIAN, OF MILWAUKEE, WISCONSIN, ASSIGNORS TO THE OILGEAR COMPANY, OF MILWAUKEE, WISCONSIN, A CORPORATION OF WISCONSIN

FLUID DRIVE FOR PLANERS

Application filed February 18, 1926. Serial No. 89,022.

This invention relates to hydraulic drives for planers and other types of reciprocating machines.

In the mechanically driven planer much time is consumed during the reversal of the planer table, due primarily to the inertia of the rotating driving parts. Furthermore such a planer affords only a rather limited range of operating speeds, and offers little flexibility toward meeting the different conditions of load ordinarily encountered in general shop practice. In other words a planer ordinarily designed for heavy duty service is inefficient on light work, and is quite unfit for work requiring a short rapid stroke.

Hydraulic drives have been heretofore designed for planers in which a wide range of operating speeds is obtained by varying the displacement of the pump which supplies the driving liquid. In these machines reversal of table motion is usually effected by reversing the eccentricity of the pump and hence the direction of flow from the pump. The pump control mechanism however cannot be operated quickly enough to make this method satisfactory for short working strokes of the planer. Also, the constant displacement hydraulic motor usually employed, if large enough to give the required maximum cutting force for heavy cuts in hard material at appropriate low speeds, is incapable of being driven by the same pump at the high speeds which should be used for lighter cuts in soft material. Hence the capacity of the prime mover cannot be fully utilized when the machine is doing light work or working on short strokes. The productive capacity of a planer doing a variety of heavy and light work is greatly reduced by these limitations.

One object of the present invention is the provision of a hydraulic drive which may be readily accommodated to widely varying conditions of cutting speed, depth of cut, and hardness of material, and which will utilize more fully the available power input of the prime mover than has heretofore been done. This is accomplished by the use of a plurality of hydraulic motors, preferably of different capacities, so arranged as to permit any one or more of them to be supplied with driving liquid, from an appropriate source such for instance as a pump. For light cuts and high speed operation only the smallest motor is thrown into use, for the heaviest cuts and slow speeds all the motors are used, and for intermediate cuts and speeds the motors may be used separately or in combinations to best suit the work at hand.

By the use of valves for controlling the motors prompt reversal may be had and the speed may be promptly changed so as to effect a rapid return stroke and a working stroke best suited for the work at hand. Such a drive when applied to a planer, increases the efficiency thereof and renders it adaptable to a much wider range of work.

Another object is the provision of means for automatically controlling the hydraulic motors so as to obtain a substantially continuous reciprocation of the driven parts at desired working and return speeds.

Other objects and advantages will appear from the following description of an illustrated embodiment of the present invention.

In the drawings:—

Figure 1 is a conventional illustration, in side elevation, of a planer equipped with a hydraulic drive embodying the present invention.

Fig. 2 is a fragmentary plan view of the planer, diagrammatically illustrating the application of the hydraulic drive thereto.

Figs. 3 and 4 are views of the control mechanism in two positions, and including sectional views of pilot valves employed.

Fig. 5 is a perspective view of a rocker element and associated cam.

Fig. 6 is a sectional view of a reversing valve.

The hydraulic drive selected for illustration is shown applied to a conventional planer having the usual bed 10, supporting the reciprocating table 11, and the usual upright 12 for supporting the tools (not shown) in the usual manner. In this instance a plurality of hydraulic motors of different capacities are employed for operating the table. Two such motors are shown in the form of cylinders 13 and 14 fixed to the bottom of the table. Both cylinders are of the same length, cylinder 13 being of greater diameter than cylinder 14. Cylinder 13 encloses a double acting piston 15 connected to the opposite ends of the bed 10 through hollow rods 16 and 17. Similarly cylinder 14 encloses a double acting piston 18 connected to the opposite ends of the bed through hollow rods 19 and 20. Ports 21 and 22 in rods 16 and 17, respectively, open into the opposite ends of cylinder 13, and ports 23 and 24 in rods 19 and 20, respectively, open into the opposite ends of cylinder 14. The arrangement is such that when fluid is admitted through rods 17 and 20, and ports 22 and 24 to the right ends of cylinders 13 and 14, the table 11 travels toward the right, fluid escaping from the left ends of the cylinders through ports 21 and 23, and rods 16 and 19; and fluid admitted through rods 16 and 19 and ports 21 and 23 causes the table to move toward the left.

The admission and discharge of fluid to and from each cylinder is controlled by a valve of appropriate form. Valves well adapted for the purpose are shown at 24 and 25. These valves are substantially identical so that a description of one will suffice for both. Each comprises a block 26 having a bore 27 therein. A piston valve having two heads 28 and 29, connected by a reduced portion 30, is closely fitted for reciprocation in the bore. The annular space surrounding the reduced portion of the valve is always open to an appropriate fluid pressure source through a pipe 31—32. The opposite ends of the bore are always open to a discharge pipe 33—34. An annular groove 35 in the bore is controlled by the piston head 28, and a similar groove 36 is controlled by the head 29. Groove 35 communicates through pipe 37—38 with rod 16—19 and groove 36 communicates through pipe 39—40 with rod 17—20.

The arrangement is such that when the valves are in the intermediate position of Figure 2, both grooves 35 and 36 communicate with the annular chamber surrounding the reduced portion 30 of the valve, so that the two ends of the cylinders are in open communication, and the pressures on the two sides of each piston are balanced, so that neither cylinder 13 or 14 exerts a driving thrust upon the table. When one of the valves, such as 24, is shifted into the right extreme position, shown in full lines in Figure 6, groove 35 is opened to the discharge pipe 33, and fluid pressure transmitted from pipe 31 through pipe 39 and rod 17 to the right end of cylinder 13 causes the table to move toward the right. Piston 18 offers no appreciable resistance to this movement because liquid discharged from the left end of cylinder 14 is free to pass through the valve 25 (which is in intermediate position) into the right end thereof. When the valve 24 is shifted into its other extreme position, as indicated in dotted lines in Figure 6, fluid pressure is applied to the left end of cylinder 13, the right end being opened to the discharge pipe 33, and the table moves toward the left. Similarly by shifting valve 25 in the manner above described, leaving valve 24 in intermediate position, the table may be made to move in response to the driving action of cylinder 14. And by shifting both valves simultaneously both cylinders may be thrown into operation.

In this instance both valves 24 and 25 are hydraulically actuated, each being provided with plungers 41 and 42 closely fitted for reciprocation in reduced bores 43 and 44, formed in the opposite ends of the block 26. Springs 45 and 46 yieldably retain each valve in the intermediate position of Figure 2. A pipe 47—48 leads from each bore 43, and a pipe 49—50 leads from each bore 44. A pilot valve 51 of appropriate form controls the flow of fluid through pipes 47 and 49, and a similar valve 52 controls the flow of fluid through pipes 48 and 50.

Each pilot valve shown comprises a block 53 having a bore 54 therein. A piston having two heads 55 and 56, connected by a reduced portion 57, reciprocates in the bore. The annular space surrounding the reduced portion 57 is in open communication with an appropriate pressure source through a pipe 58—59. Two annular grooves 60 and 61 within the bore are controlled by the heads 55 and 56, respectively, groove 60 being connected to the pipe 49—50 and groove 61 being connected to the pipe 47—48. Both ends of each bore 54 communicate with a discharge pipe 62—63.

Each of the pilot valves is controlled by a stem 64—65 projecting through a housing 66 at one end of the block 53. A spring 67 within the housing yieldably retains each valve in the intermediate position of Figure 2, in a well known manner. In this position both grooves 60 and 61 of each valve are open to the annular space surrounding the reduced portion 57, so that pipes 47—48 and 49—50 communicate and valves 24 and 25 are retained in the intermediate position by the springs 45 and 46. When the stem 65 is raised so as to adjust the valve 52 into the position shown in Figure 3 communication is established between groove 61 and discharge pipe 63, and the fluid pressure applied through pipe 50 to the bore 44 of valve 25, causes this valve to be shifted toward the left. When stem 65 is lowered so as to adjust the valve 52 into the position shown in Figure 4, communication is established between groove 60 and discharge pipe 63, so that the fluid pressure applied through pipe 48 to the bore 43 of valve 25 causes this valve to be shifted toward the right. Similarly when stem 64 of valve 51 is raised pipe 47 is opened to the exhaust pipe 62, the pressure in bore 43 is destroyed and valve 24 is shifted to the left under the pressure in pipe 49 and bore 44; and when stem 64 is depressed the pressure in pipe 49 and bore 44 is destroyed and the pressure transmitted through pipe 47 to bore 43 causes the valve 24 to shift toward the right.

In the planer shown the two pilot valves 51 and 52 are placed under the control of a rocker element controlled by the reciprocating table 11, so as to automatically reverse the table at the end of each stroke. The rocker element shown comprises a hub 68 rockably supported upon a stud 68' anchored in the bed 10 of the machine. The hub carries two upright lugs 69 and 70. Lug 69 projects upwardly into the path of travel of a stop 71, adjustably fixed to the side of table 11, and lug 70 projects into the path of travel of similar stop 72 adjustably fixed to the side of the table. (See Fig. 1.) The lugs 69 and 70 and stops 71 and 72 cooperate in a manner well known, so that it will suffice here to say that, when the table reaches the right end of its stroke stop 71 engages lug 69 and rocks the hub 68 clockwise, and when the table reaches the left end of its stroke stop 72 engages lug 70 and rocks the hub 68 counter-clockwise. The hub 68 carries a depending sector plate 73 with a plurality of cams 74, 75 and 76 removably fixed thereto. In this instance each cam is supported on a pin 77' anchored in the plate and removably fixed by a screw 78'. Cams 74 and 75 are shown attached to one face of the plate 73, and cam 76 attached to the other side of the plate. A cam roller 77, carried by the end of stem 65, is diposed between the cams 74 and 75 in such manner that when the hub 68 is rocked clockwise cam 75 acts on the roller 77 to lift the stem 65, and when rocked counter-clockwise cam 74 acts on the roller to depress the stem 65. Similarly a cam roller 78, carried by the stem 64, is disposed adjacent the cam 76, so that when hub 68 is rocked counter-clockwise stem 64 is depressed and when rocked clockwise, the stem assumes and maintains the intermediate neutral position. The cams 74, 75 and 76 may be replaced by cams of other forms and in different combinations to effect a desired shifting of the pilot valves under the control of the rocker element.

Pipes 31 and 32 are supplied with a driving liquid from an appropriate source, preferably from a positive smooth delivery pump. The pump shown at 79 is a variable displacement pump of the type fully described in the patent to Walter Ferris, No. 1,558,002, issued October 20, 1925. This pump discharges through a pipe 80 into the pipes 31 and 32 and receives liquid through pipe 81 from pipes 33 and 34. It is driven at constant speed by any appropriate means such as a belt and pulley 82, the rate of flow through pipe 80 being controlled by a hand wheel 83, by which the displacement of the pump may be varied.

In this instance pipes 58 and 59 leading to the pilot valves 51 and 52 are also supplied with fluid pressure from the pump 79, these pipes being connected through a pipe 84 with the pipe 80. Under some conditions the resistance to the flow of liquid through pipes 31 and 32 may be insufficient to maintain an operating pressure in pipes 58 and 59 and in the control circuit. In order to insure the maintenance of a working pressure within the pipes 58 and 59, provision is made for mantaining a predetermined resistance to the flow of fluid through the pipe 80. In the circuit shown this is accomplished by interposing a spring loaded valve 85 within the pipe line 80, and connecting pipe 84 to pipe 80 between the pump and the valve. Drain pipes 62 and 63 leading from the pilot valves 51 and 52 are shown connected to the return side of the pump through a pipe 86 connected with pipe 81.

A description of the operation of the planer will now be given. With the parts in the position of Figure 2, the planer table 11 is at rest at the left end of its stroke, and the pump 79, though operating, has been adjusted into zero displacement condition by a proper setting of the hand wheel 83, so that there is no flow of liquid through the pipes 80 and 81. To start the machine the operator grips the handle 100, carried by the rocker element 68 and tilts the rocker element 68 counter-clockwise so that both pilot valve 51 and 52 are lowered into the positions shown in Figure 4. The operator then, by adjusting the hand wheel 83, causes the pump to deliver liquid through pipe 80, so that liquid pressure is transmitted through pipes 84, 58 and 59, and pipes 47 and 48 to the bores 43 of the valves 24 and 25. Both valves 24 and 25 are thus shifted toward the right into the position shown in Figure 6, so that communication is established between supply pipes 31 and 32 and pipes 39 and 40, respectively, and between discharge pipes 33 and 34 and pipes 37 and 38, respectively. Liquid supplied from the pump at a definite rate then flows through pipe 80 into and through pipes 31 and 32, 39 and 40, and rods 17 and 20 into the right ends of both cylinders 13 and 14, and both cylinders exert a thrust on the table 11 causing the same to travel toward the right on a cutting stroke. Liquid from the left ends of the cylinders escapes through rods 16 and 19, pipes 37 and 38, pipes 33 and 34, and pipe 81 back to the pump. Under the driving action of both cylinders 13 and 14, the planer is capable of effecting a heavy cut with only moderate pump delivery pressures. Because of the large volume of liquid demanded by both cylinders however, the rate of movement of the table 11, under these conditions, is rather slow. This condition is ideal for heavy cuts.

The table 11 continues to travel toward the right until the stop 71 strikes the lug 69 and tilts the rocker element 68 clockwise. Cam 76 is thus withdrawn from the roller 78 permitting stem 64 of valve 51 to return to neutral position and cam 75 acting on the roller 77 lifts the stem 65. Valve 51 thus assumes a neutral position and valve 52 the upper position as indicated in Figure 3.

The return of valve 51 into neutral opens communication between pipes 47 and 49 so that valve 24 is free to return to neutral position under the action of the spring 46. The valve 24 in its neutral position opens communication between pipes 37 and 39 so as to permit a free flow of liquid between the opposite ends of cylinder 13. The cylinder 13 is thus free to idle with movement of the table. In the upper position of valve 52 pipe 48 is opened to the exhaust pipe 63 so that the pressure in bore 43 is destroyed, and the pressure transmitted through pipe 50 to bore 44, causes the valve 25 to shift toward the left into the dotted line position of Figure 6. The right end of cylinder 14 is thus opened to exhaust through the pipes 40 and 34 and liquid flowing through pipes 32 and 38 causes the cylinder 14 to exert a thrust on the table 11 to move the table toward the left on a return stroke. Because of the relatively small volume of liquid demanded by the single cylinder 14, the table 11, under these conditions travels at a relatively rapid rate, appropriate for a quick return stroke.

It will be noted that by removing the cam 76 from the rocker element the pilot valve 51 and, consequently the reversing valve 24, may be permitted to remain in neutral position irrespective of the rocking action of the rocker element. The cylinder 13 would thus idle and the table 11 be actuated by the cylinder 14 only. The table 11 under such conditions would produce a rapid cutting stroke as well as a rapid return stroke, a condition well suited for light cuts. Furthermore since reversal is effected merely by shifting a valve, the reversal is exceedingly prompt, thus rendering the planer well fitted for rapid short-stroke work.

It will also be noted that by removing the cam 74, and retaining cams 75 and 76, the valve 52, and consequently the valve 25, may be permitted to assume a neutral position when the rocker element is shifted counterclockwise, thus permitting the cylinder 14 to idle during the cutting stroke. Under such conditions the cylinder 13 alone would effect the cutting stroke, and the cylinder 14 the return stroke. Since the volume of liquid demanded by cylinder 13 is greater than that demanded by the cylinder 14 the speed of the table during the cutting stroke would be less than during the return stroke, but somewhat greater than when both cylinders are operating, as in the combination first described.

Thus for heavy cuts both cylinders may be thrown into operation, for moderately heavy cuts the large cylinder 13 may alone be used, and for light cuts the smaller cylinder 14 alone may be used, and in each instance the small cylinder 14 is preferably used alone to effect the rapid return stroke. A driving force appropriate for various conditions of load may thus be obtained with the pump operating at or near its full capacity, and consequently with little variation in horse-power demands on the prime mover.

Conversely, when both cylinders are driving, so as to produce a heavy cutting force, the full capacity of the pump is ordinarily required to give sufficient cutting speed. When the large cylinder only is driving at moderately heavy cuts, the pump is ordinarily operated at full capacity in order to obtain somewhat greater cutting speeds appropriate for the moderate cuts. A very high cutting speed is practicable for very light cuts, so that when the small cylinder only is used, under light cuts, the pump is ordinarily operated at full capacity to obtain the desirable high cutting speeds. Thus the use of a pump with a plurality of motors permits the pump to operate at or near full displacement and horse-power through a wide range of cutting speeds. This result is not attainable with the old method of using a single hydraulic motor, and depending solely upon a variation in pump displacement to obtain a variation in speed. In this old method the pump must be operated at excessive pressures to give an adequate cutting force under heavy load conditions, or it will fail to give sufficient cutting speeds under light loads.

Under any of the several operating conditions above described the speed of the table may of course be varied by adjusting the hand wheel 83 to vary pump displacement.

For convenience of illustration the cylinders 13 and 14 are shown side by side beneath the table 11, although in actual practice it may be advantageous to arrange them one above the other below the central axis of the table.

Various changes may be made in the embodiment of the invention hereinabove specifically described without departing from or sacrificing any of the advantages of the invention as defined in the appended claims.

We claim:—

1. A machine having a reciprocating member, a plurality of reversible motors each operable to drive said member in either direction, a pump for delivering a driving liquid to said motors, and valve means adjustable to connect said pump in driving relation with one or more of said motors to effect operation of said member in either direction at any of a plurality of speeds.

2. A machine having a reciprocating member, a plurality of reversible hydraulic motors of different capacities each operable to drive said member in either direction, a pump, and valve means adjustable to connect said pump in driving relation with one or another of said motors to effect operation of said member in either direction at any of a plurality of speeds.

3. A machine having a reciprocating member, a plurality of reversible motors of different capacities for driving said member, a variable displacement pump, valve means adjustable to connect said pump in driving relation with one or another of said motors to reverse and regulate the speed of said member, and means for regulating pump displacement to further regulate the speed of said member.

4. In a machine having a reciprocating member a plurality of reversible motors of different capacities for driving said member, a variable displacement pump, means for regulating pump displacement, and valve means controlled by said member for connecting said pump in driving relation with one or another of said motors to reverse and regulate the speed of said member.

5. In a machine having a reciprocating member, a plurality of pistons and cylinders for operating said member, a pump, and valve means adjustable to connect the discharge side of said pump with either end of any of said cylinders to render the same selectively operable to drive said member at different speeds in either direction.

6. In a machine having a reciprocating member, a plurality of pistons and cylinders of different capacities for driving said member, a pump, valve means adjustable to connect the discharge side of said pump with either end of either of said cylinders, and means controlled by said member for normally controlling said valve means.

7. In a machine having a reciprocating member, a plurality of pistons and cylinders for driving said member, a fluid pressure source, a valve for each cylinder operable to open communication between the opposite ends thereof or to connect said pressure source with either end thereof, and means for controlling said valves.

8. In a machine having a reciprocating member, a plurality of pistons and cylinders of different capacities for driving said member, a pump, a valve for each cylinder operable to open communication between the opposite ends thereof or to connect said pump with either end thereof and means for controlling said valves.

9. In a machine having a reciprocating member a plurality of pistons and cylinders of different capacities for driving said member, a pump, a valve for each cylinder operable to open communication between the opposite ends thereof or to connect said pump with either end thereof, and means controlled by said member for normally controlling said valves.

10. In a machine having a reciprocating member, a plurality of pistons and cylinders for driving said member, a pump, a valve for each cylinder normally maintaining communication between the opposite ends thereof, means for operating each valve to connect said pump with either end of the associated cylinder, and means controlled by said member for normally controlling said means.

11. In a machine having a reciprocating member, a plurality of pistons and cylinders for driving said member a pump, a valve for each cylinder, normally maintaining communication between the opposite ends thereof, fluid actuated means for operating each valve to connect said pump with either end of the associated cylinder, a pilot valve for controlling said fluid actuated means, and means controlled by said member for normally controlling said pilot valves.

12. In a machine having a reciprocating member, a hydraulic motor for driving said member, a pump, a valve controlling communication between said pump and motor to reverse the same, fluid actuated means driven by said pump for operating said valve, means for maintaining pump delivery pressure sufficient to operate said fluid actuated means and a valve controlled by said member for controlling the operation of said fluid actuated means.

13. In a machine having a driven member, hydraulically actuated means for driving said member, a pump for delivering driving liquid to said means, a valve controlling communication between said pump and means, fluid actuated means operated by said pump for operating said valve, means for maintaining pump delivery pressure sufficient to operate said fluid actuated means, and a valve for controlling said fluid actuated means.

In witness whereof, we hereunto subscribe our names this 15th day of February, 1926.

WALTER FERRIS.
GEORGE H. FOBIAN.